(12) United States Patent
Creamer et al.

(10) Patent No.: US 7,308,079 B2
(45) Date of Patent: Dec. 11, 2007

(54) AUTOMATING TESTING PATH RESPONSES TO EXTERNAL SYSTEMS WITHIN A VOICE RESPONSE SYSTEM

(75) Inventors: Thomas E. Creamer, Boca Raton, FL (US); Brent L. Davis, Deerfield Beach, FL (US); Peeyush Jaiswal, Boca Raton, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 10/736,315

(22) Filed: Dec. 15, 2003

(65) Prior Publication Data

US 2005/0129184 A1    Jun. 16, 2005

(51) Int. Cl.
*H04M 1/24* (2006.01)
(52) U.S. Cl. ............... 379/27.04; 379/1.02; 379/10.03; 379/88.02; 704/201; 704/246; 704/270.1
(58) Field of Classification Search ............ 379/88.01, 379/88.18, 1.02, 26.01, 29.01, 10.03, 27.04; 704/201, 246, 270.1
See application file for complete search history.

(56) References Cited

U.S. PATENT DOCUMENTS

| | | | |
|---|---|---|---|
| 6,292,468 B1 | 9/2001 | Sanderson | |
| 6,516,051 B2 | 2/2003 | Sanders | |
| 6,532,278 B2 | 3/2003 | Kim | |
| 6,697,964 B1* | 2/2004 | Dodrill et al. | 714/38 |
| 2002/0076008 A1* | 6/2002 | Neary | 379/88.01 |
| 2002/0077819 A1* | 6/2002 | Girardo | 704/260 |
| 2003/0212561 A1* | 11/2003 | Williams et al. | 704/270.1 |

OTHER PUBLICATIONS

U.S. Appl. No. 10/741,499, Bou-Ghannam et al.

* cited by examiner

*Primary Examiner*—Duc M. Nguyen
*Assistant Examiner*—Aung T. Win
(74) *Attorney, Agent, or Firm*—Akerman Senterfitt

(57) ABSTRACT

A method of testing path a voice response system can include establishing a voice link between a test system and a voice response system and playing voice prompts to the test system over the voice link. The method also can include sending execution information to the test system over the voice link.

12 Claims, 1 Drawing Sheet

AUTOMATING TESTING PATH RESPONSES TO EXTERNAL SYSTEMS WITHIN A VOICE RESPONSE SYSTEM

BACKGROUND

1. Field of the Invention

The invention relates to the field of voice response systems and, more particularly, to testing voice response systems.

2. Description of the Related Art

A voice response system (VRS) can provide an automated way of communicating information between a user and a business. Although it is unlikely that VRS's will totally replace human operators in the near future, such systems are becoming more pervasive throughout business for simple interactions. For instance, while it is still the norm to deal with a human for directory inquiries for national and international calls, simple introductory functions such as acquiring a name can be performed by a VRS.

During development of a VRS application, it is necessary to simulate a plurality of calls so that performance of the VRS under strain can be monitored as well as to test the execution of particular software or computer program modules in the VRS. Such a simulation can be performed using a testing system such as a bulk call generator which can make telephone calls to the VRS directly or through some sort of network and/or switching system. Each simulated telephone call can be programmed into the testing system and associated with a particular application or program. Several types of telephone calls may be designed and the testing system may simulate one or a combination of different calls at the same time using several channels connected to the VRS system.

A VRS, including the VRS operational software, can be tested to determine whether correct prompts are played in response to various user inquiries. Execution information pertaining to the execution of the operational software of the VRS can be stored in local memory necessitating access local execution logs or other data stores within the VRS itself. Presently, testing of VRS's, particularly the verification of execution information such as execution path verification and verification of the execution of software modules, is not performed in an automated fashion.

SUMMARY OF THE INVENTION

The present invention provides a method, system, and apparatus for automatically testing a voice response system (VRS). The present invention allows a tester to evaluate a VRS, whether co-located with the system under test or remote from the system. In accordance with the inventive arrangements disclosed herein, execution information relating to the operational software of the VRS can be provided to a test system using the same interface through which users interact with the VRS.

One aspect of the present invention can include method of testing a VRS. The method can include establishing a voice link between a test system and a VRS and playing voice prompts to the test system over the voice link. The method also can include sending execution information to the test system over the voice link. The voice link can be a voice channel such that the voice response system sends the execution information to the test system using a primary interface of the VRU.

In one embodiment of the present invention, the execution information can be specified using one or more dual tone multi-frequency signals. The execution information can specify information regarding execution of operational software of the VRS.

In another embodiment of the present invention, voice prompts received from the VRS can be speech recognized. The speech recognized voice prompts can be compared with expected voice prompts, for example a programmed script of expected voice prompts. Similarly, execution information received from the VRS can be compared with expected execution information.

Other embodiments of the present invention can include a system having means for performing the various steps disclosed herein and a machine readable storage for causing a machine to perform the steps described herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
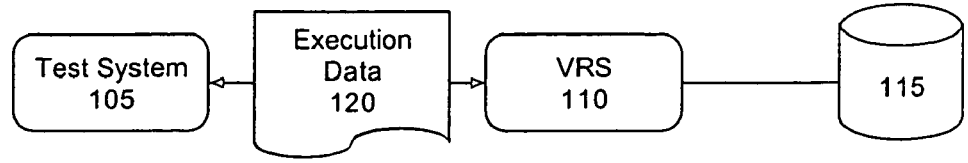
FIG. 1 is a schematic diagram illustrating a system for testing a voice response system in accordance with one embodiment of the present invention.

FIG. 1 is a schematic diagram illustrating a system 100 for testing a voice response system (VRS) in accordance with one embodiment of the present invention. As shown, the system 100 can include a test system 105, a VRS 110, and a data store 115.

The test system 105 can be implemented as a standalone, hardware-based system or as a combination of both hardware and software. For example, in one embodiment, the test system 105 can be implemented as a call generator having or being communicatively linked with sound generation and analysis equipment. In another embodiment, the test system 105 can be implemented as an information processing system having a suitable telephony or network interface. In any case, the test system 105 can be configured to establish a communication link, such as a voice link with the VRS 110. Such a voice link, for example a telephone call, can be established through a Public Switched Telephone Network, a packet-switched network, whether a local area network, a wide area network or the Internet, or a test bed environment.

The test system 105 can make selections in the VRS 110 by playing speech and/or dual tone multi-frequency (DTMF) signals over an established telephone call or voice link with the VRS 110, thereby causing the VRS 110 to perform one or more programmatic actions which can be tested. The test system 105 can be programmed to play suitable responses causing the VRS 110 to execute particular computer programs, software modules, or portions thereof, referred to as operational software, to be tested.

The test system 105 can play audible messages including speech and/or DTMF signals, whether generated by playing recorded messages or by generating speech using a text-to-speech system incorporated within, or communicatively linked to, the test system 105. The test system 105 also can receive audible prompts from the VRS 110. In one embodiment, the test system 105 can include, or be connected with, a speech recognition system for converting prompts played by the VRS 110 to text. The VRS 110 also can include a processor for decoding or recognizing DTMF signals. The processor can be hardware based, for example the telephony interface, or software-based, for example a signal processing application program or the speech recognition system.

The VRS 110 can be implemented as one or more computer programs, software modules, and the like, referred to as operational software, executing within an information processing system. Like the test system 105, the VRS 110 can include a telephony interface for receiving audio including speech and/or DTMF signals. Accordingly, the VRS 110 can answer received telephone calls and play audible prompts to callers over the telephone call. The audible prompts can be generated using a text-to-speech system or can be generated by playing recorded portions of audio. Additionally, the VRS 110 can include a speech recognition system for converting received spoken responses to text and processing DTMF signals.

The VRS 110 can be configured to provide execution information 120 over a voice link established between the testing system 105 and the VRS 110. More particularly, the execution information 120 can be provided through the primary audio interface used to communicate with users of the VRS 110 during normal operation. The VRS 110 can be placed in a test mode where execution information 120 is provided over the same voice link or call as voice prompts.

For example, in one embodiment, the VRS 110 can include test computer programs which gather execution information and store the information within the communicatively linked data store 115. While the invention is not limited to the use of one particular type of computer program, in one embodiment the test computer program(s) can be implemented as Java methods. Once the VRS 110 executes the appropriate operational software, or portions thereof, a prompt can be played over the voice link. The test computer program(s) within the VRS 110 can encode the execution information stored in the data store 115 as DTMF signals which can be played over an established call with the testing system 105. Thus, the VRS 110 can play prompts over the calls and play DTMF signals over calls. The DTMF signals, however, are representative of execution information pertaining to the execution of the VRS 110 operational software.

Figure 2:
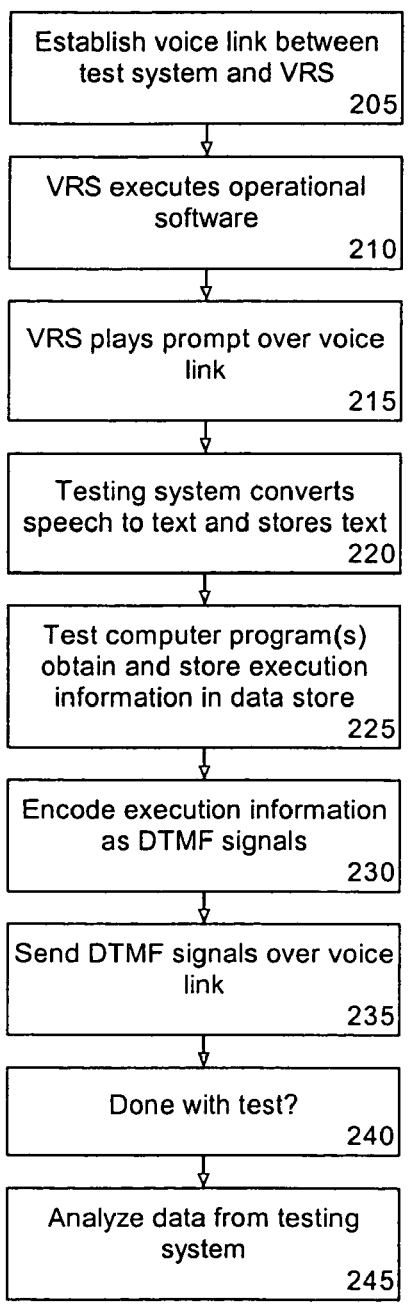
FIG. 2 is a flow chart illustrating a method testing a voice response system in accordance with another embodiment of the present invention.

FIG. 2 is a flow chart illustrating a method 200 of automating testing responses in accordance with another embodiment of the present invention. The method can begin in step 205 where a voice link is established between a testing system and a VRS to be tested. The voice link can be a telephone call, whether an IP-based telephone call, a mobile call, a wireless call, a conventional telephone call, or some other voice link. In one embodiment, the testing system and the VRS can be remotely located from one another allowing the VRS to be tested without being located on premises with the system. In another embodiment, the testing system and the VRS can be located proximate to one another and communicate over a telephone call or a simulated telephone call, for example through a test bed environment.

In step 210, the VRS can execute operational software programs to determine which prompt to play over the established voice link. In step 215, the VRS plays an audible prompt over the established voice link. In step 220, the testing system can speech recognize the received prompt from the VRS and store the recognized text. In step 225, the test computer program(s) of the VRS obtain and store execution information in the data store. The execution information can specify test execution path verification information and verifications of the execution of VRS operational software, i.e., computer programs or modules used by the VRS during execution of the test. Other examples of execution information can include, but are not limited to, paths and address names such as universal resource locators, execution conditions such as pass/fail and data retrieved, method calls, and the like. Execution information can include any information that relates to or is generated by the execution of the operational software of the VRS.

In step 230, the VRS can encode execution information as DTMF signals to be played to the test system over the established voice link. In step 235, the encoded information, that is the DTMF signals, can be played over the voice link. In step 240, a determination can be made as to whether the test of the VRS is complete. For example, if the test is complete, the testing system can hang up or terminate the call. In that case, the method can proceed to step 245. If the test is not complete, the test system can select another option. In that case, the method can proceed to step 210 to continue as may be required.

Continuing with step 245, the data received by the testing system can be analyzed. For example, the testing system can be programmed with a script of expected prompts from the VRS to which the speech recognized prompts can be compared. The received DTMF signals can be decoded and automatically compared with programmed specifications indicating expected execution data. The test system can generate a report indicating which prompts and/or execution information matched specifications listing expected prompts and/or execution information. Still, it should be appreciated that the information collected by the testing system can be manually examined.

The method described herein has been provided as an example of one embodiment of the present invention. It should be appreciated by those skilled in the art that the ordering of the steps can vary according to the particular configuration used. For example, execution information that is encoded as DTMF signals can be provided from the VRS such that the information is interspersed with prompts, is provided periodically, or is provided at the end of a session, and need not follow each prompt. Additionally, execution information can be recorded as it becomes available.

The present invention can be realized in hardware, software, or a combination of hardware and software. Aspects of the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

Aspects of the present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof.

Accordingly, reference should be made to the following claims, rather than to the foregoing specification, as indicating the scope of the invention.

What is claimed is:

1. A method of verifying software program operations during execution of a voice response system comprising:
    establishing a voice link between a test system and the voice response system;
    executing one or more operational software programs in the voice response system to determine a voice prompt to play over the established voice link;
    performing speech recognition at the test system to speech recognize the voice prompt played over the established link and convert the voice prompt to text;
    gathering at the voice response system execution information associated with the one or more executing operational software programs, wherein the execution information identifies computer programs and modules used by the voice response system during the step of executing one or more operational software programs, and wherein the execution information comprises at least one execution condition specifying data retrieved in executing one or more operation software programs and at least one execution condition specifying a method call performed in executing one or more operation software programs;
    representing the execution information using one or more dual tone multi-frequency signals; and
    sending the one or more one or more dual tone multi-frequency signals representing the execution information to the test system over the voice link.

2. The method of claim 1, wherein the computer programs and modules are specified by path address name and method call names.

3. The method of claim 1, further comprising comparing speech recognized voice prompts with expected voice prompts.

4. The method of claim 1, further comprising comparing execution information received from the voice response system with expected execution information.

5. A system for verifying software program operations during execution of a voice response system comprising:
    means for establishing a voice link between a test system and the voice response system;
    means for executing one or more operational software programs in the voice response system to determine a voice prompt to play over the established voice link;
    means for performing speech recognition at the test system to speech recognize the voice prompt played over the established link and convert the voice prompt to text;
    means for gathering execution information associated with the executing one or more operational software programs, wherein the execution information identifies computer programs and modules used by the voice response system during the step of executing one or more operational software programs, and wherein the execution information comprises at least one execution condition specifying data retrieved in executing one or more operation software programs and at least one execution condition specifying a method call performed in executing one or more operation software programs;
    means for representing the execution information using one or more dual tone multi-frequency signals; and
    means for sending the execution information to the test system over the voice link, wherein the execution information pertains to the execution of the one or more operational software programs on the voice response system.

6. The system of claim 5, wherein the computer programs and modules are specified by path address names and method call names.

7. The system of claim 5, further comprising means for comparing speech recognized voice prompts with expected voice prompts.

8. The system of claim 5, further comprising means for comparing execution information received from the voice response system with expected execution information.

9. A machine readable storage, having stored thereon a computer program having a plurality of code sections executable by a machine for causing the machine to perform the steps of:
    establishing a voice link with a test system; establishing a voice link between a test system and a voice response system;
    executing one or more operational software programs in the voice response system to determine a voice prompt to play over the established voice link;
    performing speech recognition at the test system to speech recognize the voice prompt played over the established link and convert the voice prompt to text;
    gathering execution information associated with the one or more executing operational software programs, wherein the execution information identifies computer programs and modules used by the voice response system during the step of executing one or more operational software programs, and wherein the execution information comprises at least one execution condition specifying data retrieved in executing one or more operation software programs and at least one execution condition specifying a method call performed in executing one or more operation software programs;
    representing the execution information using one or more dual tone multi-frequency signals; and
    sending the one or more one or more dual tone multi-frequency signals representing the execution information to the test system over the voice link.

10. The machine readable storage of claim 9, wherein the computer programs and modules are specified by path address names and method call names.

11. The machine readable storage of claim 9, further comprising comparing speech recognized voice prompts with expected voice prompts.

12. The machine readable storage of claim 9, further comprising comparing execution information received from the voice response system with expected execution information.

* * * * *